US006805947B1

(12) United States Patent
Brimer et al.

(10) Patent No.: US 6,805,947 B1
(45) Date of Patent: Oct. 19, 2004

(54) ACID IMPERVIOUS COATED METAL SUBSTRATE SURFACE AND METHOD OF PRODUCTION

(75) Inventors: Jerry Wynn Brimer, Canyon Country, CA (US); Ernie Robert Silva, Duarte, CA (US); William K. Oehlert, deceased, late of Helotes, TX (US), by Paula Oehlert, legal representative; James A. Kirk, Long Beach, CA (US); Benjamin S. Wong, Diamond Bar, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/632,017

(22) Filed: Aug. 2, 2000

Related U.S. Application Data

(62) Division of application No. 09/248,172, filed on Feb. 9, 1999, now Pat. No. 6,124,000.

(51) Int. Cl.[7] .......................... B32B 15/08; B32B 27/06
(52) U.S. Cl. ............................... 428/297.4; 428/300.7; 428/301.1; 428/301.4; 428/327; 428/457; 428/458
(58) Field of Search .......................... 428/297.4, 300.7, 428/301.1, 301.4, 458, 457, 319.7, 327; 427/195, 201

(56) References Cited

U.S. PATENT DOCUMENTS

| | | | | |
|---|---|---|---|---|
| 3,458,595 A | | 7/1969 | Ulmer | 525/423 |
| 3,893,977 A | | 7/1975 | Wingler | 260/77.5 |
| 3,968,280 A | * | 7/1976 | Poppe et al. | 428/458 |
| 4,009,231 A | | 2/1977 | Wasserman et al. | 264/3 |
| 4,017,447 A | | 4/1977 | Larsen et al. | 260/31.2 |
| 4,183,998 A | * | 1/1980 | Vassiliou | 428/327 |
| 4,213,486 A | | 7/1980 | Samour et al. | 138/143 |
| 5,387,653 A | | 2/1995 | Merval et al. | 525/420 |
| 5,830,975 A | * | 11/1998 | Perraud et al. | 528/170 |
| 5,993,975 A | * | 11/1999 | Tanaka et al. | 428/458 |

OTHER PUBLICATIONS

KAPTON, DuPont, Aug. 1997.*

* cited by examiner

*Primary Examiner*—Monique R. Jackson
(74) *Attorney, Agent, or Firm*—Stetina Brunda Garred & Brucker

(57) ABSTRACT

A method of rendering a surface of a metal substrate substantially acid impervious. The method includes first placing the surface in a field of treatment, then depositing a mixture of a high-temperature resistant polymer particulate such as polyamide particulate and a curable powder adhesive on the surface, and finally subjecting the surface-coated metal substrate to a curing treatment sufficient to cure the powder adhesive and thereby adhere the polymer particulate as a film on the surface. A steel substrate coated in accord with the present methodology is particularly useful as a curing fixture upon which resin-impregnated fiber of polymer composite material is placed to thereby give molded parts made therefrom a desired shape. Production of a part is accomplished by vacuum bagging the composite material to the steel fixture and curing the so-produced part in place on the fixture in an autoclave at an elevated temperature. In this manner the acid impervious curing fixture allows production of composite parts without the danger of leaching iron from the fixture to thus assure full-utility part fabrication.

8 Claims, 1 Drawing Sheet

ACID IMPERVIOUS COATED METAL SUBSTRATE SURFACE AND METHOD OF PRODUCTION

This is a divisional of prior application Ser. No. 09/248,172, now U.S. Pat. No. 6,124,000, filed Feb. 9, 1999.

FIELD OF THE INVENTION

This invention relates in general to metal substrate surface coatings, and in particular to methodology and coated products therefrom for rendering a surface of a metal substrate substantially acid impervious by depositing a mixture of a high-temperature resistant polymer particulate such as polyamide particulate and a curable powder adhesive on the surface of the metal substrate and thereafter curing the adhesive to thereby adhere the polyamide particulate as a film on the surface.

BACKGROUND OF THE INVENTION

In certain applications it is necessary to provide a substantially acid-impervious metal substrate that comes into contact with another substrate whose chemical acidity acts to leach any available iron from the metal substrate. One important application is found in curing fixtures used to fabricate polymer composite resin-impregnated parts. In particular, resin-impregnated fiber of polymer composite material is placed on a steel curing fixture to give parts made therefrom a desired shape. The composite material is vacuum-bagged to the steel fixture and cured in an autoclave at an elevated temperature, all as known in the art. However, certain high-temperature polymer composite materials that cure above about 500° F. will corrode the steel fixture while contemporaneously producing a bad part that exhibits undesirable reduced oxidative properties and high porosity.

It has been found that the reason for the above described corrosion and poor product yield is due to acid from the composite material acting to leach iron from the steel fixture. Because of the resulting untoward effect, it is most important to block acid passage into the fixture to thereby prevent iron leaching into the fabricated part. Accordingly, a primary object of the present invention is to provide methodology for providing a coating to a metal surface such as the surface of a steel curing fixture to thereby render that surface substantially acid impervious.

Another object of the present invention is to provide such methodology wherein the coating is deposited on the metal surface as a mixture of high-temperature resistant polymer particulate such as a polyamide particulate and a curable powder adhesive which thereafter is cured to adhere the polymer particulate as an acid impervious coating on the surface.

Yet another object of the present invention is to provide an acid impervious steel curing fixture having a high-temperature resistant polymer particulate coating thereon which is temperature resistant up to about 700° F.

These and other objects of the present invention will be apparent throughout the description thereof which now follows.

SUMMARY OF THE INVENTION

The present invention is a method of rendering a surface of a metal substrate substantially acid impervious. The method comprises first placing the surface in a field of treatment, then depositing a mixture of a high-temperature acid-impervious polymer particulate such as polyamide particulate and a curable powder adhesive on the surface, and finally subjecting the surface-coated metal substrate to a curing treatment sufficient to cure the powder adhesive and thereby adhere the polymer particulate as a film on the surface. Preferably, the polymer particulate is acid-impervious up to about 700° F., while the powder adhesive in all cases of course cures below the acid-imprevious level of the polymer particulate.

A steel substrate coated in accord with the present methodology is particularly useful as a curing fixture upon which resin-impregnated fiber of polymer composite material is placed to thereby give molded parts made therefrom a desired shape. Production of a part is accomplished by vacuum bagging the composite material to the steel fixture and curing the so-produced part in place on the fixture in an autoclave at an elevated temperature. In this manner the acid impervious curing fixture of the present invention allows production of composite parts without the danger of leaching iron from the fixture to thus assure full-utility part fabrication.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

While a surface of substantially any metal substrate is a candidate for the coating of the present invention, the preferred embodiment addresses fabrication of a steel curing fixture employed in the production of composite parts made from material that has an acid content and that is cured while in contact with the steel curing fixture.

Figure 1:
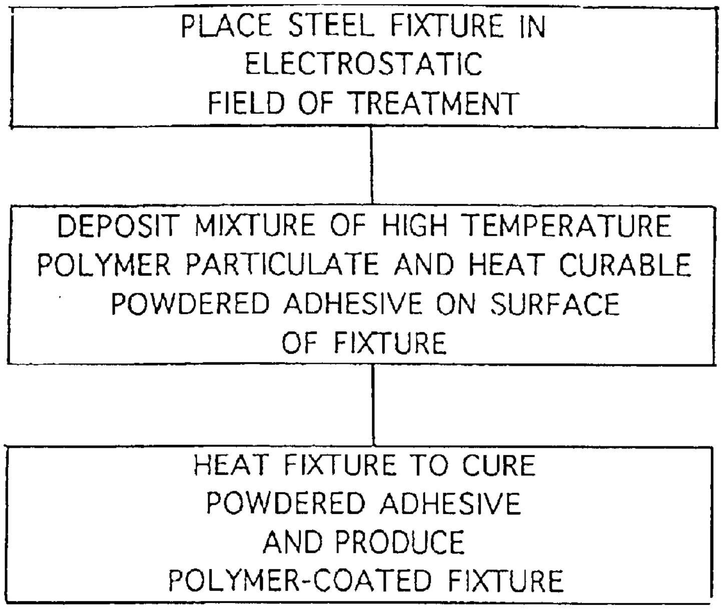
FIG. 1 is a flow diagram of preferred methodology in fabricating a coated curing fixture.

Referring to FIG. 1, preferred methodology for fabricating a steel curing fixture whose surface has an acid impervious coating first involves placement of the fixture in a field of treatment. Preferably, this field of treatment permits an electrostatic deposition environment and therefore either charges or grounds the steel fixture as known in the art so that charged deposition material is electrically attracted to the fixture. The acid impervious coating provided by preferred methodology initially comprises a polymer particulate, acid impervious at high temperature, most preferably a polyamide particulate, and a non-cured powder adhesive preferably heat-curable, with such heat curing occurring at a temperature below said high temperature of the polymer particulate. The most preferred polyamide for particulate production is KAPTON, manufactured by DuPont Co., Wilmington, Delaware, which is acid impervious up to about 700° F. If the polymer is available in film form only, the film first must be chopped to produce a particulate wherein, most preferably, each particle thereof has a total surface area of about 0.008 square inch. Preferred adhesive powder is a conventional polyamide powder adhesive that heat-cures at a temperature below about 650° F. and is acid impervious up to about 700° F.

Figure 2:
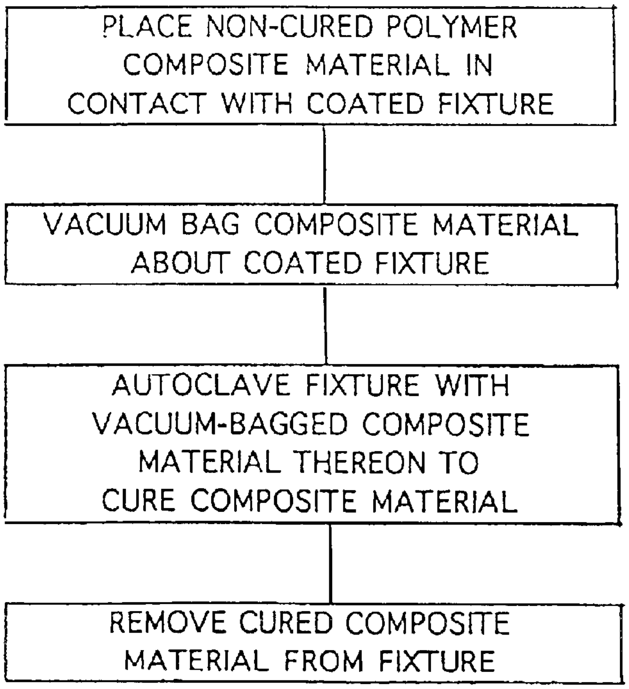
FIG. 2 is a flow diagram of preferred methodology for fabricating a composite-material part employing a coated curing fixture of FIG. 1.

A mixture of high-temperature resistant polymer particulate and powder adhesive is prepared such that sufficient particulate is provided to cover the surface to be coated and sufficient adhesive is present to maintain particulate adhesion to the surface. This mixture preferably is deposited electrostatically on the surface of the steel curing fixture, after which the fixture is placed in an oven or autoclave or otherwise heated to the curing temperature of the powder adhesive to thereby cause adherence of the polyamide particulate as a coating. As illustrated in FIG. 2, the steel fixture so produced is acid impervious to thereby permit contact of resin-impregnated fiber of polymer composite material subsequently vacuum bagged about the fixture and thereon cured at an elevated temperature to thus fabricate composite parts.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A fiber-reinforced resin composite part comprising a steel substrate and a cured resin layer in between the steel substrate and the fiber-reinforced resin part wherein the cured resin layer comprises dispersed polyamide particles, is resistant to temperatures up to 700° F., and prevents acid in the composite part from leaching iron from the steel substrate.

2. The composite part of claim 1 wherein the particles has a total surface area of about 0.008 square inches.

3. The composite part of claim 1 wherein the resin layer is coated over the steel substrate.

4. The composite part of claim 3 wherein the mixture conforms to the steel substrate in film form.

5. The composite part of claim 1 wherein the particles are evenly dispersed in the cured resin layer such that the composite part has full utility out of the cured resin layer and steel substrate.

6. The composite part of claim 1 wherein the particles have a chopped film shape.

7. The composite part of claim 1 wherein a cured operating temperature of the cured resin layer is greater than a leaching temperature of the part, the leaching temperature being a temperature at which acid from the composite part leaches iron from the substrate to produce a less than full-utility composite part of the substrate.

8. The composite part of claim 1 wherein the part has a forming temperature of above 500° F., the cured resin layer defines a cured operating temperature, and the cured operating temperature is greater than the forming temperature, the cured operating temperature being a temperature at which the cured resin layer when interposed between the part and substrate prevents acid from the part from leaching iron from the substrate to process full-utility part out of the substrate.

* * * * *